June 20, 1961  F. L. HILL ET AL  2,989,140
SELF-PROPELLED TOWER VEHICLE
Filed Feb. 14, 1955  6 Sheets-Sheet 1

INVENTORS
F. L. Hill
F. W. Tweedy
BY
ATTORNEYS

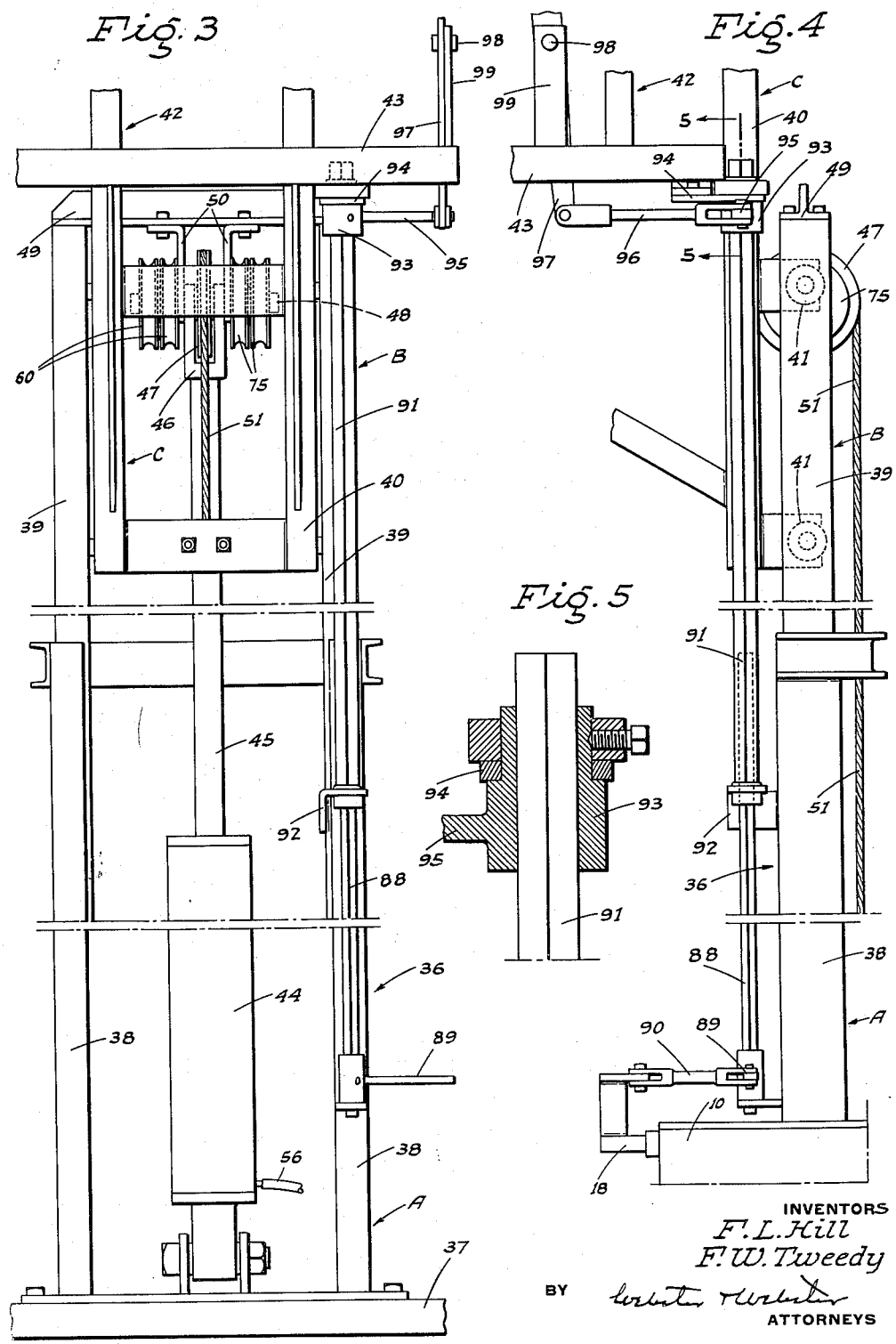

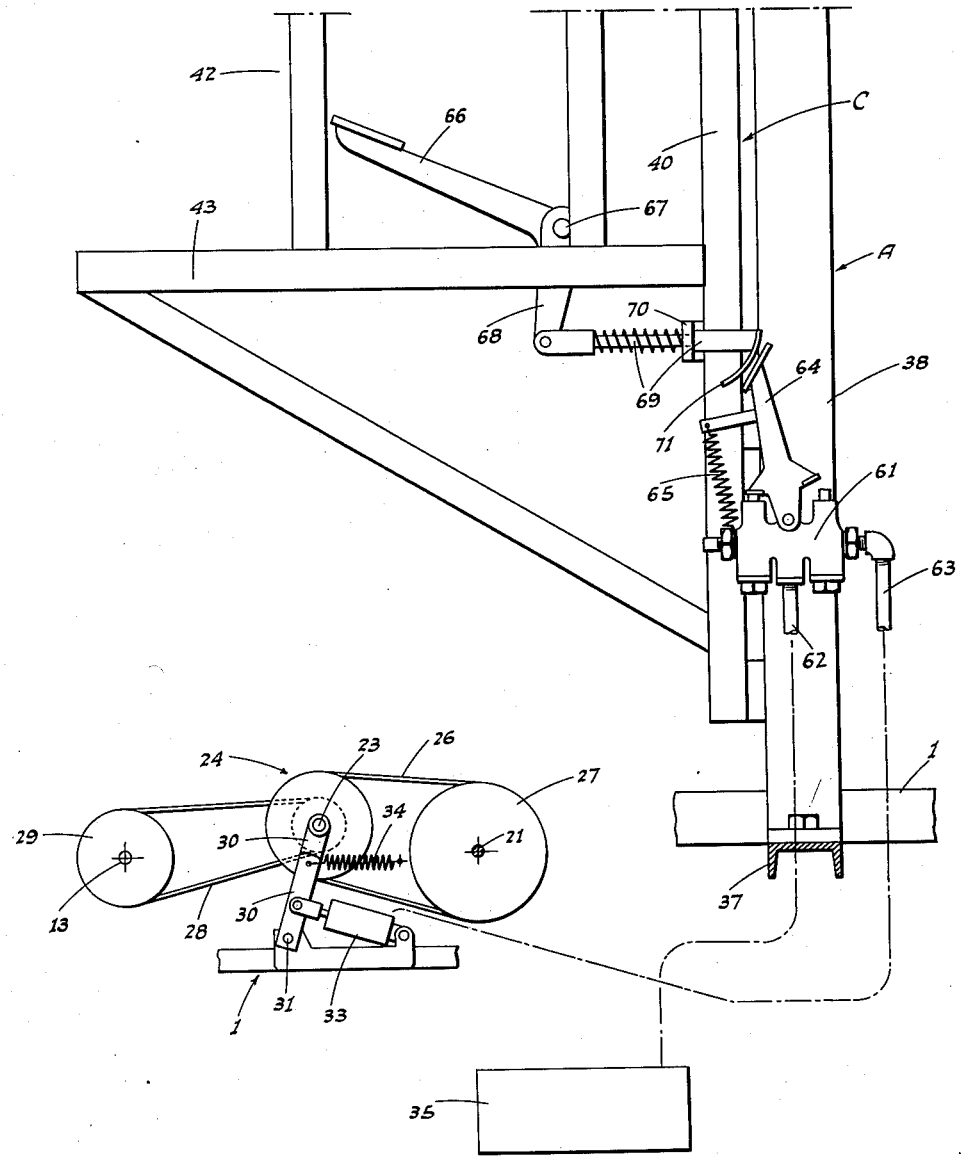

June 20, 1961 F. L. HILL ET AL 2,989,140
SELF-PROPELLED TOWER VEHICLE
Filed Feb. 14, 1955 6 Sheets-Sheet 4
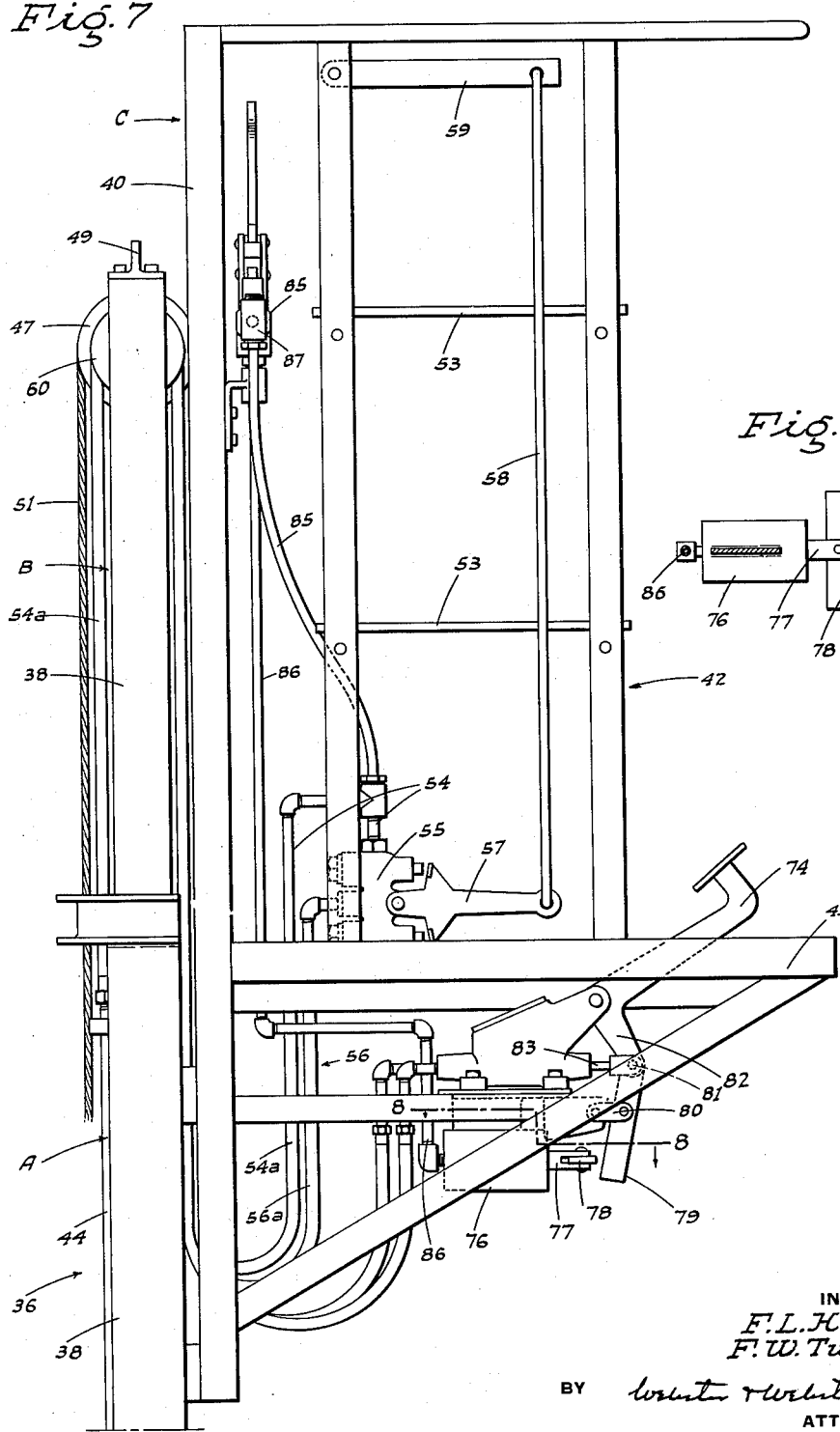
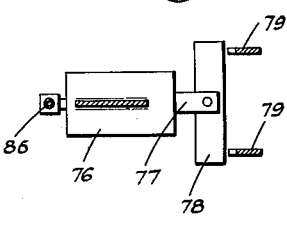
INVENTORS
F. L. Hill
F. W. Tweedy
BY
ATTORNEYS June 20, 1961  F. L. HILL ET AL  2,989,140
SELF-PROPELLED TOWER VEHICLE
Filed Feb. 14, 1955  6 Sheets-Sheet 5
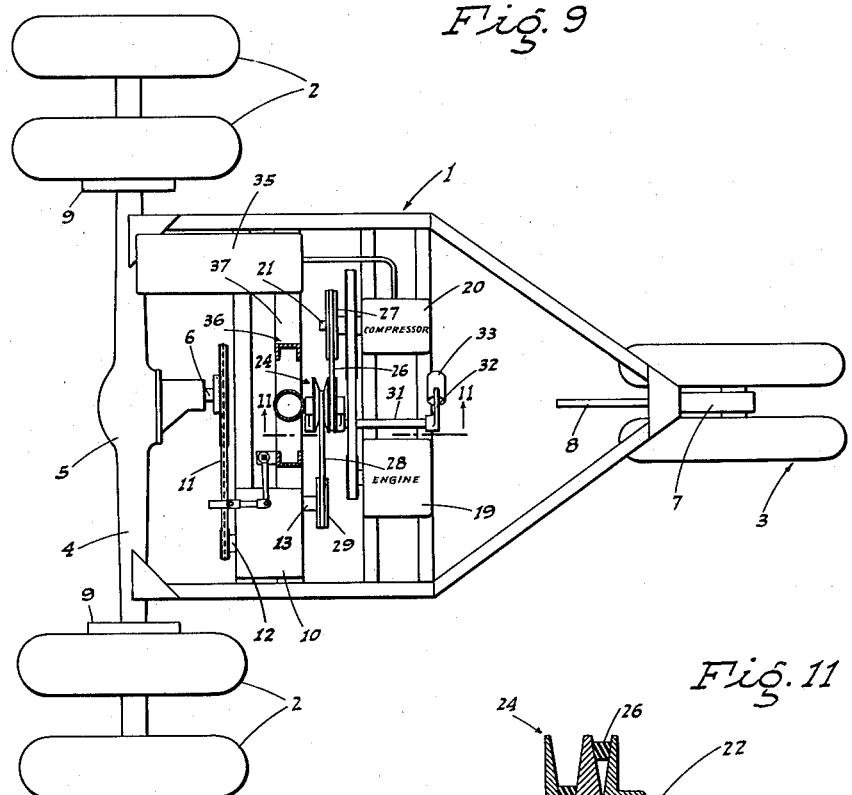
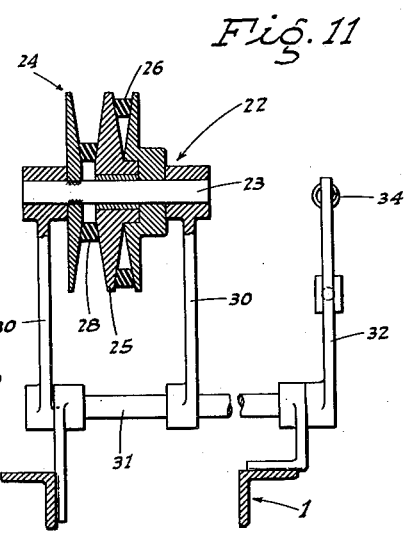
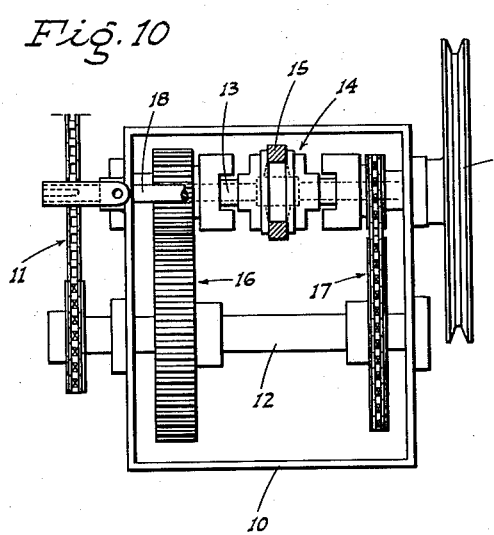
INVENTORS
F. L. Hill
F. W. Tweedy
BY
ATTORNEYS

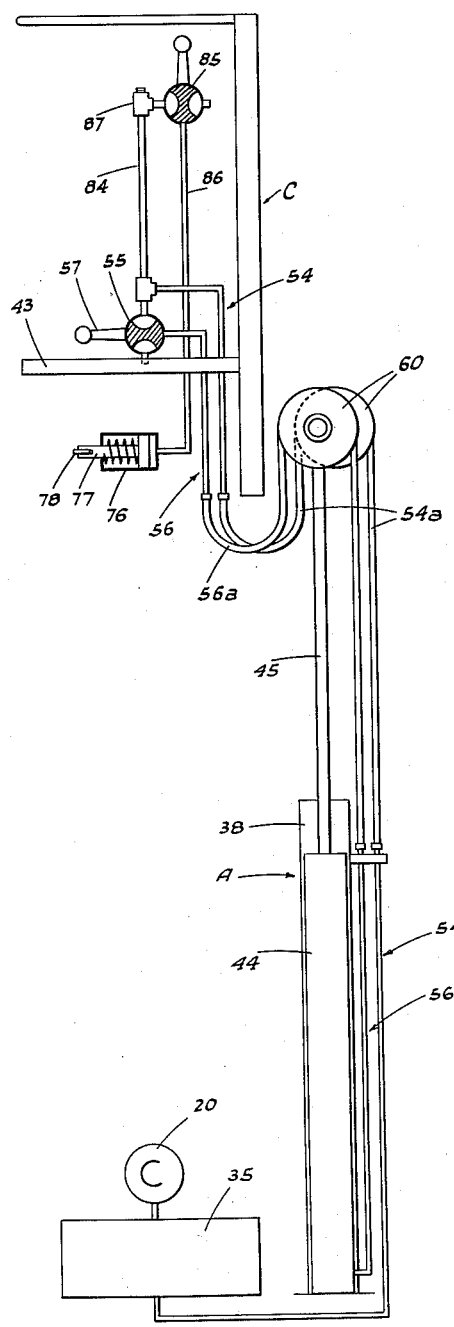
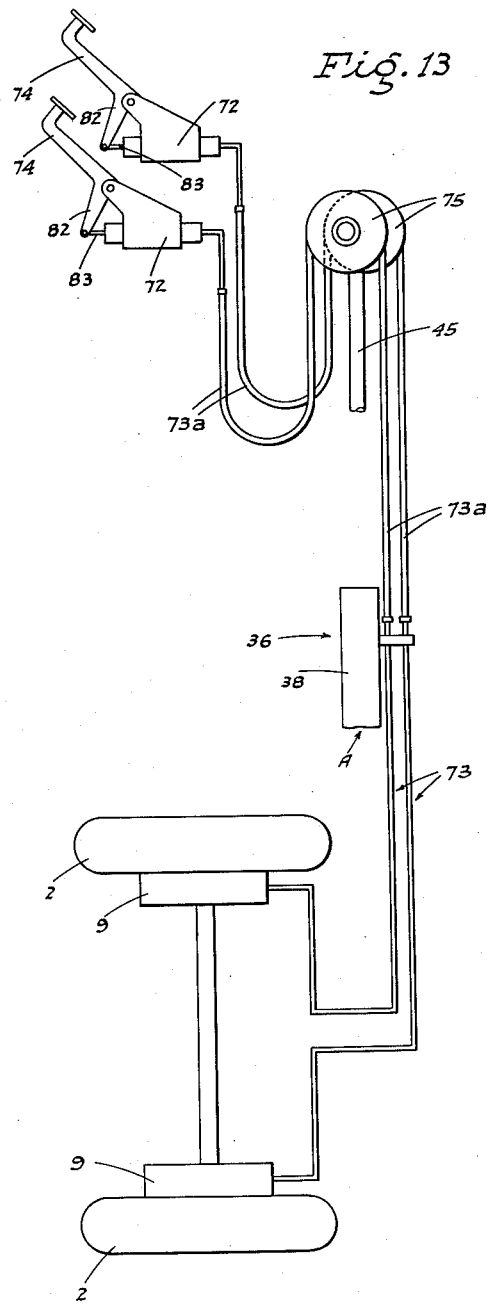

United States Patent Office 2,989,140
Patented June 20, 1961

1

2,989,140
SELF-PROPELLED TOWER VEHICLE
Fredrick L. Hill and Fay W. Tweedy, both of
275 N. Front St., Rio Vista, Calif.
Filed Feb. 14, 1955, Ser. No. 487,876
4 Claims. (Cl. 182—63)

The present invention is a continuation in part, as to all common subject matter, of our application Serial No. 98,717, filed June 13, 1949, now abandoned, and it is an object of the invention to provide a self-propelled tower vehicle adapted to support a worker at a selectively variable elevation for work; such tower vehicle being especially adapted for use in orchards for pruning, picking, or spraying.

A separate object of the invention is to provide a tower vehicle which embodies a reversibly power driven, steerable vehicle supporting a vertically extensible tower having a platform thereon for a worker; reversing and steering of the vehicle and extension of the tower all being independently and selectively controlled by the worker from said platform through the medium of a novel remote control system.

An additional object of the invention is to support the tower by a vehicle of novel construction and high maneuverability; such vehicle being three-wheeled, including a pair of transversely spaced, reversibly driven, selectively braked wheels at one end of the vehicle frame, and a single caster wheel unit at the other end of the frame.

Another object of the invention is to provide a tower vehicle which includes a novel, vertically extensible tower structure on which the worker's platform is mounted; such tower structure being selectively power extended by relatively simple but effective mechanism.

The driven wheels of the vehicle are selectively braked for steering rather than for holding purposes, and thus if the vehicle is operating in a hilly orchard it would be necessary for the operator to maintain both feet on the brake pedals to prevent the vehicle from moving downhill of itself. This would be very inconvenient and awkward to do while the operator is performing the desired pruning or other operations from his station in the crow's-nest of the vehicle.

It is therefore a further object of this invention to provide a device for setting and holding both brakes simultaneously; the means for thus actuating such device being under the control of the operator in the crows'-nest.

Also, the drive for the main wheels of the vehicle includes a shiftable two-speed mechanism. Ordinarily when the vehicle is in working position relative to a tree, the mechanism is disposed in a low-speed position, since a low speed is desirable when maneuvering the vehicle about a tree. When moving the vehicle a distance along a row of trees, however, a higher speed is desirable as a time-conserving measure, and it is desirable that the operator shall be able to change the speed of the vehicle without leaving the crow's-nest. At the same time, if the speed change is made while the tower is raised, said tower might contact and damage a protruding limb, or possibly harm the operator by throwing him against such limb or causing him to lose his balance upon sudden increase in speed of the vehicle.

A still further object of the invention therefore is to provide means for placing the speed-increasing mechanism in operation, operable by the operator in the crow's-nest, but effective only when the tower—and the crow's-nest—are fully lowered.

Still another object of the present invention is to provide a platform unit with conveniently accessible control devices for the remote control system; certain of said devices being foot-actuated and others being manual.

2

It is also an object of the invention to provide a tower vehicle which is desinged for convenience and economy of manufacture; the vehicle being sturdy, stable, and easy to maintain and operate.

A further object of the invention is to provide a practical and reliable tower vehicle, and one which will be exceedingly effective for the purpose for which it is designed.

These objects are accomplished by means of such structure and relative arrangement of parts as will fully appear by a perusal of the following specification and claims.

In the drawings:

FIG. 3 is a fragmentary enlarged rear elevation of the extended tower.

FIG. 4 is a fragmentary enlarged side elevation of the tower; FIGS. 3 and 4 showing the remote-control mechanism for reversing the drive transmission.

FIG. 5 is a fragmentary enlarged section on line 5—5 of FIG. 4.

FIG. 6 is a fragmentary side elevation of the tower, with the crows'-nest lowered, and showing the means for controlling the change-speed mechanism of the drive transmission; said mechanism being shown diagrammatically.

FIG. 7 is a view similar to FIG. 4, but looking at the opposite side of the tower and showing the brake control and locking means, as well as the ram-control means.

FIG. 8 is a fragmentary sectional plan on line 8—8 of FIG. 7.

FIG. 9 is a diagrammatic plan view of the chassis of the vehicle.

FIG. 10 is a plan view of the reversing gear box of the drive mechanism of the vehicle.

FIG. 11 is an enlarged fragmentary sectional elevation on line 11—11 of FIG. 9.

FIG. 12 is a diagram of the pneumatic-control system for the ram and the brake locking means.

FIG. 13 is a diagram of the hydraulic selective brake actuating means.

Figure 2:
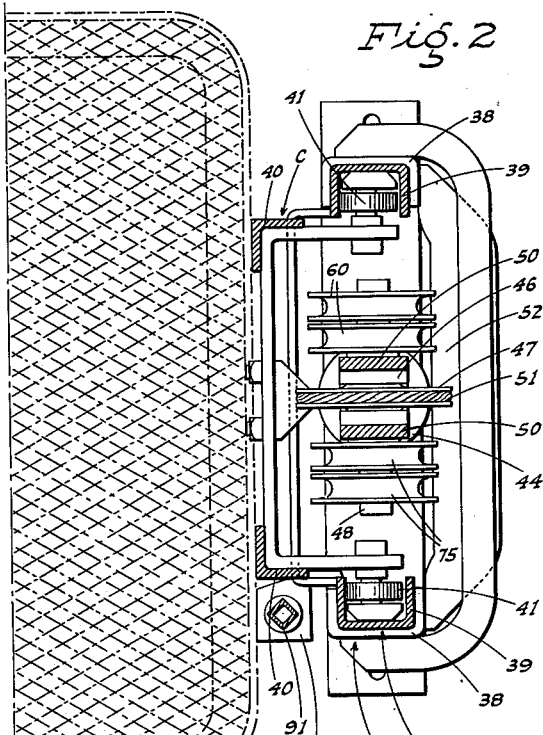
FIG. 2 is a fragmentary enlarged sectional plan on line 2—2 of FIG. 1.

Referring now more particularly to the drawings, and to the characters of reference marked thereon, the tower vehicle comprises a rigid chassis frame indicated generally at 1, and which is supported at its forward end by transversely and widely spaced wheels 2, and at its rear end by a single, centrally disposed caster wheel unit 3. Each wheel 2 may be of a single or double type, as may be best suited for the ground conditions of any particular orchard. The wheels 2 are mounted on opposite ends of an axle structure 4 which includes a differential 5 having a rearwardly projecting drive shaft 6. This shaft is reversibly driven as will hereinafter appear. This drive however is not intended to be used for movement of the vehicle any great distance, so in order to provide for convenient towing of the vehicle when desired, the mounting yoke or arm 7 of the caster unit is provided with a hitch or towing bar 8. When the caster unit is reversed from its normal rearwardly facing or trailing position, said bar then projects clear of the vehicle frame and may be connected to a towing vehicle. The caster unit then becomes the front end of a vehicle, and the wheels 2 trail.

Each wheel 2 has a hydraulic brake 9 arranged in connection therewith; these brakes being included in a control system for selective application, as will be hereinafter described. The drive shaft 6 is reversibly actuated from a reversing mechanism mounted in a case 10 secured on the frame. An endless chain and sprocket unit 11 connects the shaft 5 and the output shaft 12 of the reversing mechanism.

An input shaft 13 in case 10 parallel thereto is connected to a reversing clutch unit 14, which includes a shifting fork 15. The unit 14 is arranged to drive a pinion and gear train 16 or an endless chain and sprocket unit 17, which are connected between the shaft 12 and the opposite ends of the reversing clutch unit. Said unit has a normal neutral position, and shifting of the fork 15 in one direction or the other places the shaft 13 in driving engagement with the shaft 12 to effect a reversible drive of said shaft. The shifting fork 15 is adapted to be actuated by a shifting fork rod 18 which extends forwardly out of the case 10 for actuation by control means hereinafter described.

An engine 19 is mounted on the frame 1 rearwardly of the case 10 and drives an air compressor 20, whose shaft 21 is parallel to shaft 13. A two-speed drive unit, indicated generally at 22, is interposed between the shafts 21 and 13, and is constructed as follows, and as particularly shown in FIGS. 6 and 11.

Disposed between, and parallel to, said shafts 21 and 13 is a countershaft 23 on which a dual V-belt pulley unit 24 is mounted, and which unit includes an intermediate member 25 slidable along said countershaft so as to alter the relative diameters of the dual pulleys. An endless belt 26 extends between a pulley 27 on the shaft 21 and the rear side of dual unit 24, and another belt 28 extends between a pulley 29 on the shaft 13 and the forward side of the dual unit 24.

The shaft 23 is journaled on depending arms 30, fixed at their lower end on a swing shaft 31 journaled on the frame 1. Another arm 32 on shaft 31 at its rear end is connected to a normally inactive pneumatic ram 33 and to a spring 34; both the ram and spring extending from the arm 32 and anchor points on frame 1.

The spring 34 is arranged to act on arm 32 and swing shaft 31 in a direction to cause the belt 26 to be maintained adjacent the periphery of the dual pulley unit 24 while the belt 28 is engaging said unit radially inwardly of such periphery. As a result, the speed of pulley 29 and shaft 13 is relatively low; imparting a low speed to the vehicle.

When, however, the ram 33 is actuated to swing the shaft 23 so as to reverse the relative disposition of belts 26 and 28 on the dual pulley unit 24, the speed of pulley 29 and shaft 13 is increased, and the vehicle speed is correspondingly increased. The manner in which the ram is actuated will be described hereinafter.

The compressor 20 maintains a constant supply of air under pressure within a reservoir or tank 35 mounted on the frame 1.

Ahead of the above described change-speed and drive mechanism, and centrally between the sides of frame 1, the vehicle is provided with a vertically extensible tower, generally indicated at 36, and supported by a cross beam 37 on the frame 1. The tower comprises a fixed lower section A, which includes transversely spaced, upstanding channels 38 facing each other; an intermediate section B substantially the height of section A and which includes channels 39 sliding in channels 38; and an upper section C which includes a carriage frame 40 disposed adjacent but in front of channels 38 and 39, and which is substantially the same height as the other sections.

The lower portion of the frame 40 is provided with vertically spaced arms which project rearwardly and are disposed laterally inward of but adjacent channels 39, as shown in FIG. 2, and which arms carry rollers 41 engaging in channels 39. The upper portion of the frame provides the mounting means for a crow's-nest 42 which includes a foot platform 43. The crow's-nest is generally rectangular in form, considerably wider than the tower, and projects entirely forwardly therefrom, so as to generally overhang the front axle unit 3 of the wheels 2.

Figure 1:
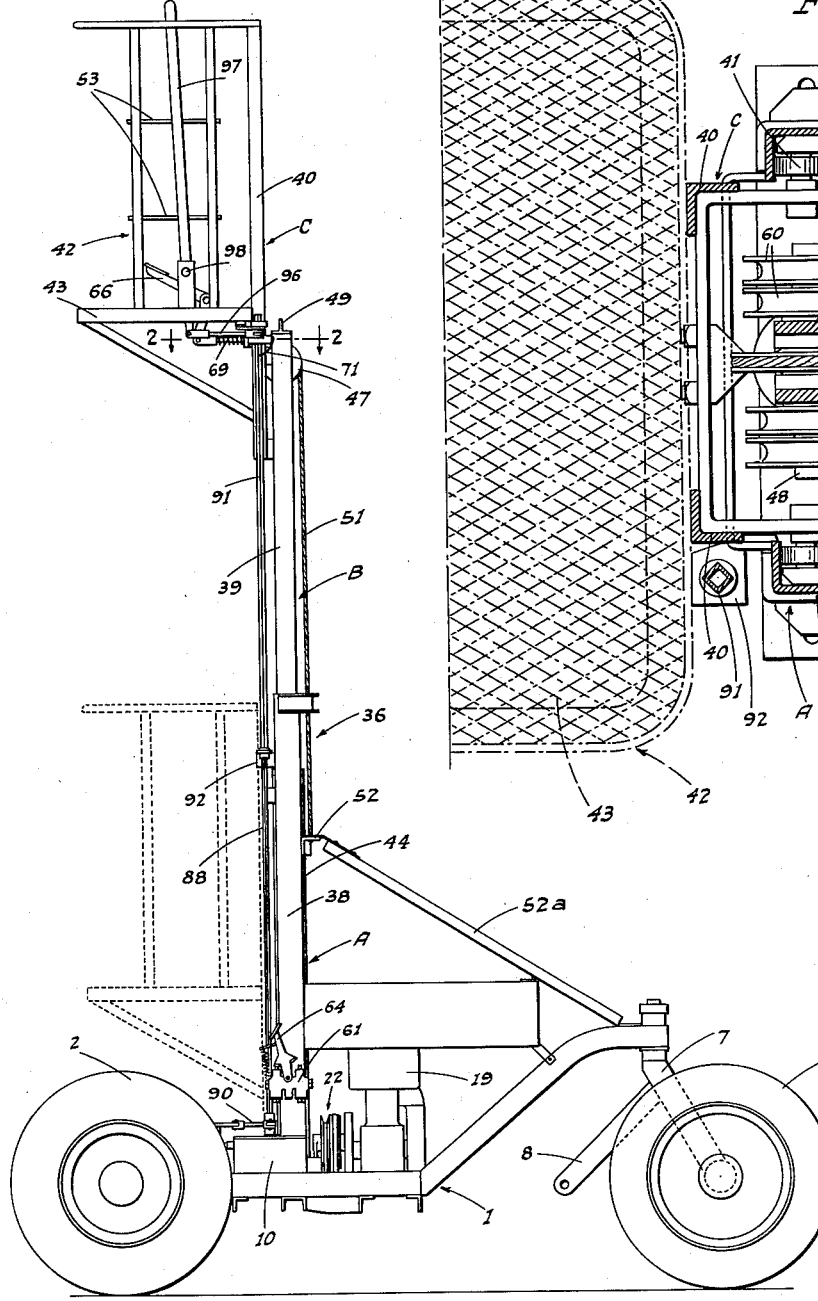
FIG. 1 is a side elevation of the tower vehicle with the tower fully extended and the crow's-nest fully elevated; the hydraulic conduits and certain related parts being omitted for purposes of clarity.

A pneumatic ram 44, which includes an upstanding piston rod 45, is supported from the beam 37 centrally between the channels 38. The rod 45 is provided at its upper end with a clevis 46 in which a pulley 47 is disposed; the pulley being mounted on a transverse shaft 48 supported by the clevis. A cross beam 49 connects channels 39 at their upper end and just above pulley 47; said beam being connected to the clevis by depending compression arms 50 so that said beam is rigidly tied to the ram 44. A cable 51 passes over the pulley 47 and is anchored at one end to the frame 40 at its lower end, and at its other end to a cross bar 52 connecting channel beams 38 intermediate their ends, as shown in FIG. 1. This cross bar 52 also provides a means for attaching a diagonal brace 52a, which extends thence rearwardly to a connection with the frame 1 at its rear end. Other than this, the tower has no bracing, nor does it require any.

By reason of the above arrangement it will be seen that upon admitting fluid pressure to the lower end of ram 44, tower section B will be raised in section A, while at the same time the upper section C will be raised from an initial position with rollers 41 adjacent the lower end of the section B to a position with rollers 41 adjacent the upper end of said section B, as shown in FIG. 4.

With this movement, section C moves twice the distance section B moves relative to section A. As a result, a great tower extension is obtained with relatively short tower sections. Also, the tower, when fully contracted, does not project any great distance above ground level. The tower, when fully extended, disposes the crow's-nest at a height such that practically all branches of a tree are accessible to an operator standing on the platform 43.

In order that he may reach higher if necessary, rungs or steps 53 are provided on opposite sides of the crow's-nest for engagement by the feet of the operator.

The ram, change-speed mechanism, drive reversing mechanism, and the selective setting and locking of the brakes, are all controlled by the operator in the following manner:

Referring to FIG. 12, in connection with FIG. 7, the control means for the ram comprises a conduit, indicated generally at 54, extending from the tank 35 to the intake of a three-way valve 55, from one outlet of which another conduit, indicated generally at 56, extends to the lower end of the ram 44. The other outlet of the valve discharges to atmosphere.

The valve 55 is mounted on the crow's-nest adjacent the platform at one side thereof, as shown in FIG. 7. Such valve is normally in a neutral position, and its actuating handle or lever 57 may be operated either by foot or by hand. In the latter case, a rod 58 extends upwardly from the handle 57 and is connected to a generally horizontal lever 59 pivoted at one end on the corresponding side of the crow's-nest adjacent the top thereof.

Upon movement of the handle 57 or lever 59 in one direction from a neutral position, air is admitted to the ram cylinder to elevate the tower sections, and upon movement of said handle or lever in the opposite direction the air will exhaust from the ram. When the valve is returned to a neutral position before such air is fully exhausted, the tower sections are of course held in a corresponding semi-extended position.

The portions of conduits 54 and 56 which extend from the valve 55 to the fixed tower section A are of course flexible and are in the form of slack hoses 54a and 56a, respectively, and are trained over guide pulleys 60 mounted on shaft 48 to one side of clevis 46, so that the hoses are maintained in properly guided relation with any up-and-down movement of the tower sections.

Referring now to FIG. 6, the control means for actuating the ram 33 of the speed-change mechanism comprises a three-way valve 61 secured on the outside of one channel 38 of fixed tower section A near the lower end thereof. The intake of this valve is connected to tank 35 by a conduit 62, while one outlet thereof is connected to the ram 33 by a conduit 63.

Since the valve is secured on the immovable section of the tower, neither of the conduits requires any flexible portions. The valve 61 is disposed on channel 38 so that the upstanding actuating lever handle 64 of the valve—when in an exhausting position—slopes forwardly, or in the direction of the crow's-nest. A spring 65 acts to normally maintain said handle in its sloping valve-exhausting position.

Mounted on the crow's-nest platform 43 is a foot pedal 66, pivoted at its rear end—as at 67—and having a depending arm 68. A push rod 69 projects rearwardly from arm 68 through a guide 70 on the frame 40; the rod being transversely alined with the handle 64.

The rear end of the rod 69 is provided with a depending, forwardly curved pad 71 adapted to engage the upper end of the handle and swing the same rearwardly, or to a position such that air will be admitted to the ram, but only when the crow's-nest is in a fully lowered position.

The ram may thus be extended, to increase the speed of the vehicle, only as long as the pedal 66 is maintained in a depressed position, since as soon as the pedal is released the spring 65 acts to swing handle 64 to an air exhausting position.

The brakes 9 are hydraulic, and the actuating systems thereof are self-contained as in automotive practice.

Referring to diagrammatic FIG. 13, in connection with FIG. 7, each system comprises a master cylinder unit 72 from which a conduit, indicated generally at 73, extends to the corresponding brake 9. An actuating pedal 74 is connected to each cylinder unit 72.

The units 72 are mounted in side-by-side relation under the platform 43 of the crowsnest, with the pedals 74 projecting upwardly through the platform for selective actuation by the foot of the operator, as shown in FIG. 7.

By setting one or the other of the brakes while the engine 19 is connected in driving relation with the axle unit of wheels 2, the vehicle will be steered in one direction or the other, as will be evident.

The conduits 73 include flexible slack hoses 73a which extend from adjacent the units 72 to the fixed tower section 2, and such hoses are hung intermediate their ends on pulleys 75 mounted on shaft 48 to the side of clevis 46 opposite pulley 60.

Both brakes may be held set by maintaining the feet simultaneously on both pedals, but this is hardly practicable, so to enable the brakes to be set simultaneously and held as long as may be necessary, a hand-actuated mechanism is preferably employed. This mechanism is shown in FIGS. 7, 8, and 12 and is arranged as follows:

Mounted in connection with, and directly below, the units 72 centrally therebetween is a pneumatic cylinder 76 having a spring-retracted piston rod 77 projecting forwardly therefrom, or in the direction of the brake pedals 74.

A transverse equalizing bar 78 is pivoted centrally of its ends on the forward end of rod 77, with its end portions arranged to engage depending levers 79. These levers are pivoted intermediate their ends on anchor links 80, and at their upper end are pivoted, as at 81, on the lower end of the arms 82 which depend from the rear pivoted end of the pedals 74, and which arms retract the brake setting rods 83 into the cylinder units 72 when the pedals are depressed.

By reason of this arrangement it will be seen that when either pedal is depressed the lower portion of the corresponding lever 79 is swung away from the bar 78, which is initially adjacent but clear of said lever. When, however, the piston rod 77 is advanced, the bar 78 will engage and swing both levers 79 forwardly at their lower end and rearwardly at their upper end, thus applying both brakes simultaneously.

The rod 77 is thus advanced, and held advanced, as long as may be desired, by the following means:

Connected to conduit 54 ahead of its connection with the valve 55 is another conduit 84 which extends upwardly to the intake of a three-way valve 85 of a type which will remain of itself in any position to which it may be set by hand. This valve is mounted on the crowsnest in any position convenient for operation.

A conduit 86 extends from one outlet of the valve to the rear end of cylinder 76; the other outlet of the valve discharging to atmosphere.

In connection with conduit 84, a fitting 87 is interposed therein ahead of the valve 85 and to which fitting the hose of a pneumatic pruning tool or the like may be attached.

Referring now particularly to FIGS. 3 to 5, the structure for shifting the clutch unit 14 from the crowsnest is constructed as follows:

Turnably supported from that channel 38 which is on the same side as gear box 10 is a non-circular shaft 88, substantially the height of said channel. An arm 89 projects laterally out from the shaft 88 at its lower end in overlying relation to the gear box 10, and is connected to the outer end of shifter rod 18 by a link 90 so that upon rotation of said shaft 88 rod 18 will be shifted lengthwise.

Slidably and non-turnably mounted on the shaft 88 is another tubular shaft 91 of non-circular exterior contour which extends to the upper end of section B, and to the adjacent platform 43 when the tower is fully extended. At its lower end the shaft 91 is anchored against axial movement by a bracket 92 secured to the adjacent channel 39 of section B.

At its upper end the shaft 91 is slidable through, but non-turnable in, a bushing 93 which is turnably supported, while being held against axial movement by a bracket 94 fixed on and projecting from the platform 43.

An arm 95 projects laterally out from the bushing 93, said arm being connected by a longitudinally extending link 96 to the lower end of an upstanding actuating lever 97 which is pivoted intermediate its ends, as at 98, on a support 99 upstanding from the platform 43 on one side thereof. Swinging of this lever in one direction or the other will thus turn the shafts 88 and 91 as a unit, irrespective of the setting of the sections of the tower relative to each other.

The various flexible conduit hoses are of course disposed with a maximum of slackness when the tower is lowered or contracted. Hanging these hoses on the pulleys of the tower elevating ram not only prevents the hoses from possible entanglement with any fixed parts of the tower, but the hoses are protected against possible damage from exterior sources, since the pulleys on which the hoses are hung are disposed between, and in effect shielded by, the rigid channel members of the tower.

By reason of the specific positioning of the tower on the chassis, and the relationship of the tower to the widely spaced front wheels of the vehicle, the weight of the tower and the worker thereon is distributed substantially centrally between the relatively widely spaced wheels so that any tendency of the vehicle to tip laterally or longitudinally is prevented.

Also, the tower being of slim form, and the crowsnest projecting entirely forwardly from the tower, the worker can maneuver himself very close to the limbs of a tree without the tower coming in contact therewith.

By reason of the three-section tower as described, a tower of relatively great height when fully extended is obtained, while at the same time the overall height of the vehicle when the tower sections are fully retracted is kept to a minimum.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An extensible chassis-mounted tower comprising a fixed lower section, an intermediate section, and an upper section which includes an operator-supporting crows'-nest, all said sections being initially in a lowered and relatively telescoped relation to each other; means to extend the intermediate and upper sections relative to each other and to the lower section and including a fluid ram mounted on the chassis, a supply of fluid under pressure mounted on the chassis, means to control a flow of fluid from the supply to the ram including a control valve mounted on the crows'-nest, and conduits extending from the supply to the valve and from the valve to the ram; said conduits including slack flexible portions, and pulleys turnably mounted on the intermediate section adjacent its upper end and on which the flexible conduit portions intermediate their ends are hung in supported relation.

2. In a tower vehicle which includes a chassis frame, transversely spaced wheels supporting the frame at one end, and another wheel supporting the frame at its other end; a tower upstanding from the frame intermediate its ends, and an operator-supporting platform mounted on the tower and projecting therefrom clear of the adjacent face of the tower in the direction of said one end of the frame; the tower below the platform being disposed on the chassis in a longitudinal plane between said other wheel and the transversely spaced wheels and relatively close to the latter, with the platform overhanging the axial line between said transversely spaced wheels.

3. An extensible tower comprising a stationary lower section, a vertically movable intermediate section guided by the lower section and comprising a pair of transversely spaced channels and a cross beam connecting the channels at the top, and an upper section disposed in front of and guided for vertical movement by the channels of the intermediate section, said upper section including a cross member at its lower end, a vertical ram mounted centrally between the channels and comprising a fixed cylinder and an upstanding piston rod under and connected at its upper end to said cross beam, a transverse-axis pulley mounted on the piston rod adjacent and under the cross beam in axial intersection with the axis of said rod, and a cable about the pulley; the cable at one end being anchored on the cross member and at the other end being anchored on the stationary section, and the opposed runs of the cable being substantially vertical and parallel.

4. An extensible tower comprising a stationary lower section, a vertically movable intermediate section guided by the lower section and comprising a pair of transversely spaced channels and a cross beam connecting the channels at the top, and an upper section comprising a vertical frame in front of the channels of the intermediate section and including a cross member at its lower end, arms projecting rearwardly from said cross member, and rollers on the arms engaging said channels in guiding relation; means applied to the intermediate section to raise and lower the same, a transverse-axis pulley mounted on the intermediate section at its upper end in substantially centralized relation thereto, and a cable trained about and depending from the pulley; the rear run of the cable being anchored at its lower end on the stationary section, and means anchoring the forward run of the cable to the cross member at a point rearwardly thereof and centrally of the width of the frame, the opposite runs of said cable being parallel to each other and to the tower sections.

References Cited in the file of this patent

UNITED STATES PATENTS

| | | |
|---|---|---|
| 1,053,080 | Whitney | Feb. 11, 1913 |
| 1,272,287 | Martell | July 9, 1918 |
| 2,035,294 | Black | Mar. 24, 1936 |
| 2,046,429 | Ronning | July 7, 1936 |
| 2,088,854 | Greiner | Aug. 3, 1937 |
| 2,196,511 | Wagner et al. | Apr. 9, 1940 |
| 2,254,192 | White | Aug. 26, 1941 |
| 2,279,832 | Le Tourneau | Apr. 14, 1942 |
| 2,375,104 | Heitshu | May 1, 1945 |
| 2,388,873 | Schwab | Nov. 13, 1945 |
| 2,420,903 | Noble | May 20, 1947 |
| 2,505,583 | Sage | Apr. 25, 1950 |
| 2,510,325 | Anderson | June 6, 1950 |
| 2,526,583 | Schlessman | Oct. 17, 1950 |
| 2,565,777 | Moon | Aug. 28, 1951 |
| 2,606,078 | Brock | Aug. 5, 1952 |
| 2,632,530 | Wagner | Mar. 24, 1953 |
| 2,676,677 | Anderson et al. | Apr. 27, 1954 |
| 2,689,025 | Yates | Sept. 14, 1954 |